(12) United States Patent
Hu

(10) Patent No.: US 11,945,741 B1
(45) Date of Patent: Apr. 2, 2024

(54) CENTRALIZED WASTEWATER TREATMENT METHOD AND SYSTEM

(71) Applicant: Select Water Solutions, Houston, TX (US)

(72) Inventor: Jinxuan Hu, Conroe, TX (US)

(73) Assignee: Select Water Solutions, Houston, TX (US)

( * ) Notice: Subject to any disclaimer, the term of this patent is extended or adjusted under 35 U.S.C. 154(b) by 0 days.

(21) Appl. No.: 18/365,659

(22) Filed: Aug. 4, 2023

(51) Int. Cl.
*C02F 3/12* (2023.01)
*C02F 3/30* (2023.01)

(52) U.S. Cl.
CPC ............ *C02F 3/1268* (2013.01); *C02F 3/302* (2013.01)

(58) Field of Classification Search
CPC ........... C02F 3/1268; C02F 3/302; C02F 9/00
USPC ...................... 210/600, 620, 532.2
See application file for complete search history.

(56) References Cited

U.S. PATENT DOCUMENTS

| | | | | |
|---|---|---|---|---|
| 5,895,569 | A * | 4/1999 | Connelly ............... | E03F 11/00 405/36 |
| 10,724,314 | B1 * | 7/2020 | Yates .................... | E21B 21/065 |
| 2010/0206807 | A1 * | 8/2010 | Ripley ................... | C02F 3/28 210/603 |
| 2017/0158536 | A1 * | 6/2017 | Rivera-Gerena ........ | C02F 9/00 |

FOREIGN PATENT DOCUMENTS

| | | | | |
|---|---|---|---|---|
| CN | 109133513 | A * | 1/2019 | .............. C02F 9/00 |
| JP | 2006000062 | A * | 1/2006 | |
| WO | WO-9708106 | A1 * | 3/1997 | .............. B09C 1/10 |
| WO | WO-2014130042 | A1 * | 8/2014 | .............. C02F 11/02 |

OTHER PUBLICATIONS

Fenner et al, "Process selection for sanitation systems and wastewater treatment in refugee camps during disaster relief situations", Water and Environment Journal 21, pp. 252-264 (Year: 2007).*
Sharpe, "Temporary Man Camps and Oilfield Shops", Alaska Business Monthly, pp. 46-53 (Year: 2015).*
Engin et al, "Cost analysis of alternative methods for wastewater handling in small communities" Journal of Environmental Management 79, pp. 357-363 (Year: 2006).*
Vigneault et al, "The Design, Operation and Performance of the New Membrane Bioreactor (MBR) WWTP for the Becket-Chimney Corners YMCA Camps in Western Massachusetts" Water Practice & Technology vol. 4 No. 3, pp. 1-9 (Year: 2009).*
Gao, CN 109133513A, English machine translation, pp. 1-9 (Year: 2019).*
Oyoshi et al, JP 2006000062A, English Machine Translation, pp. 1-5 (Year: 2006).*

* cited by examiner

*Primary Examiner* — Claire A Norris
(74) *Attorney, Agent, or Firm* — Haynes and Boone, LLP

(57) ABSTRACT

A centralized sewage treatment system for treating man camp wastewater from a plurality of oilfield well pads where each man camp has one or more septic tanks. The centralized sewage treatment system includes a centralized treatment facility having a primary treatment system and a secondary treatment system, where the centralized treatment facility is disposed centrally between the plurality of well pads and spaced apart from the well pads. The centralized treatment facility is adapted to receive wastewater from each of the plurality of well pads and treat the wastewater remote from the plurality of well pads. The primary treatment system includes one or more equalization tanks and the secondary treatment system includes a membrane treatment system.

27 Claims, 5 Drawing Sheets

CENTRALIZED WASTEWATER TREATMENT METHOD AND SYSTEM

FIELD OF THE DISCLOSURE

The present disclosure relates generally to wastewater and sewage treatment systems and methods, and, more particularly, to systems and methods for a centralized treatment facility for the treatment of sewage produced by man camps at well pads for oil and gas operations.

BACKGROUND

A well pad is a temporary area occupied by equipment or facilities necessary or required for the drilling, production, or plugging of an oil or natural gas well. Well pads may contain one or more wellheads and associated equipment. Well pads having hydrocarbon extraction activities that require on-site personnel typically include a man camp. A man camp is temporary housing for personnel supporting hydrocarbon extraction activities, and typically include sleeping structures along with associated electrical systems, HVAC systems and plumbing systems. Temporary housing facilities such as man camps can overwhelm local utilities and, therefore, often employ their own water and wastewater systems.

Traditional sewage treatment processes for domestic wastewater (i.e., graywater and blackwater) arising from man camps at oilfield well pads require an individual mobile water treatment system for each individual well pad. As a result, each individual oilfield well pad is required to apply for the appropriate permitting to operate such treatment systems, increasing the cost of operation of a well pad.

Operating a mobile wastewater treatment system at each oilfield well pad can also be inefficient. Due to cost restrictions, most well pads operating an individual mobile wastewater treatment system do not employ full primary treatment processes such as solid settlement, equalization, or solid screening processes because of the low volume of wastewater produced at an individual well pad (typically only 1,500 gallons/day or less). For this same reason, mobile wastewater treatment systems do not include secondary treatment systems that have a minimum throughput requirement. Such secondary treatment systems typically require a minimum throughput of 8,000 gallons/day of treated fluid. This is particularly true of secondary treatment systems utilizing membrane treatment systems such as membrane bioreactor (MBR) systems and membrane aerated biofilm reactor (MABR) systems. Such membrane treatment systems require minimum daily throughputs that greatly exceed the maximum daily volume of wastewater produced at most man camps. Moreover, such membrane systems are expensive, and it is cost prohibitive for an overall oil field to install such a system at each man camp within the oil field. As a result, the individual treatment systems can be restricted in terms of the type and quality of incoming wastewater, called "influent," that they are equipped to receive and process, resulting in treated wastewater, called "effluent."

Mobile wastewater treatment systems can also be inefficient due to the inherent instability and inconsistency in operational conditions at the oilfield well pads. The volume of wastewater generated from a well pad man camp can vary greatly depending on the time of day and the stage of the drilling operation of the well pad. For example, biological treatment processes employed in treating the wastewater produced at the man camps take time to stabilize, and the instability and inconsistency of the inflow of influent can result in inconsistent and undertreated effluent.

DETAILED DESCRIPTION

Described herein is a centralized wastewater treatment system for use with a plurality of oilfield well pads disposed within a predetermined distance about the centralized sewage treatment system, where the centralized wastewater treatment system includes both a primary treatment system and a secondary treatment system capable of accepting different types, quantities and qualities of wastewater from the man camps of different oilfield well pads. As used herein, wastewater includes stormwater, greywater and blackwater.

Figure 1:
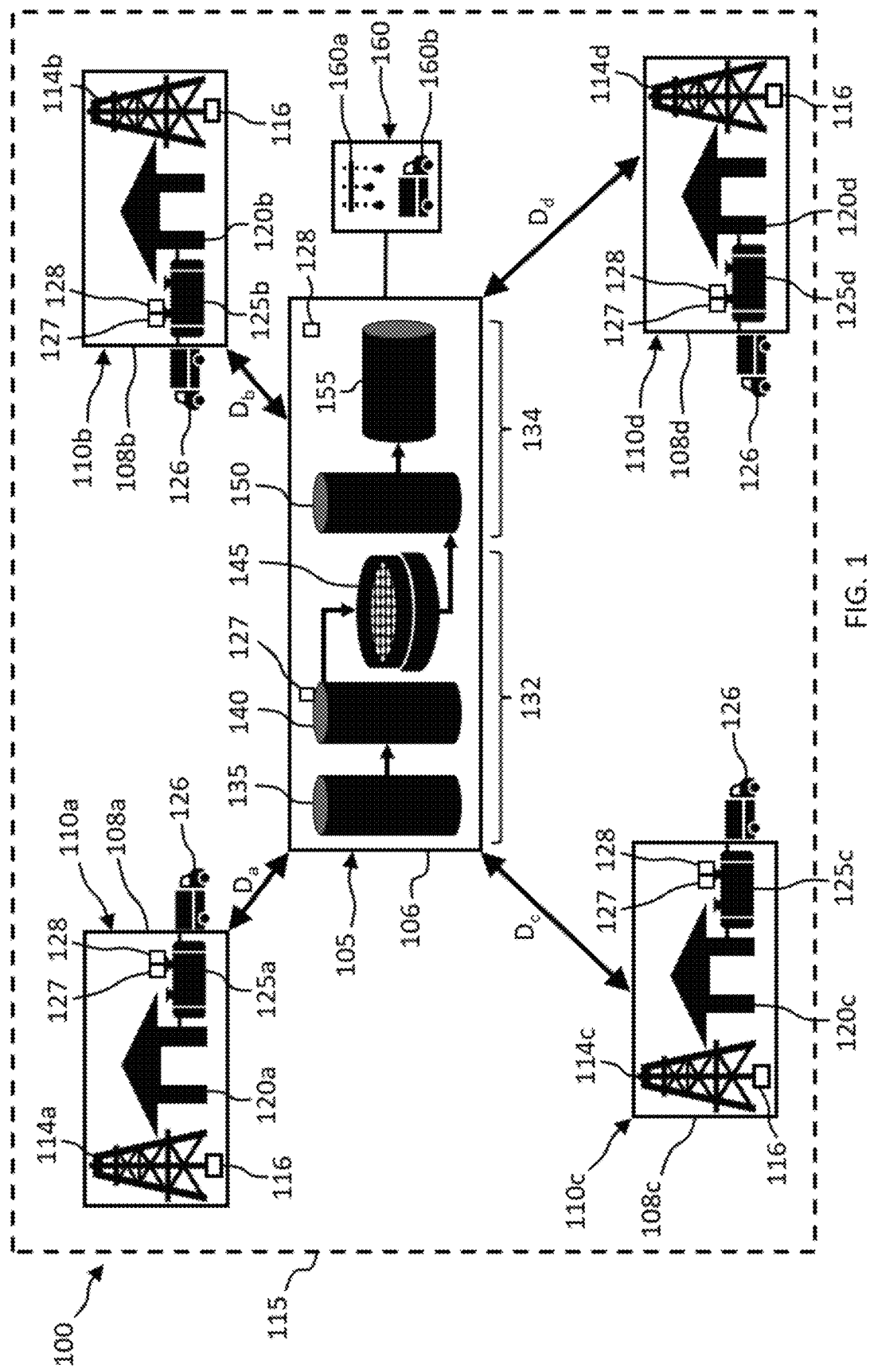
FIG. 1 is an illustration of a centralized sewage treatment system including a centralized treatment facility adapted to service a plurality of oilfield well pads, according to one or more embodiments of the present disclosure.

Referring to FIG. 1, a centralized wastewater treatment system 100 is shown according to one or more embodiments. The centralized wastewater treatment system 100 includes a centralized treatment facility 105 at a first or central location 106 adapted to service a plurality of oilfield well pads 110 within a geographic area 115, where each oilfield well pad 110 is at a separate secondary or remote location 108 spaced apart a distance D from the central location 106. Each well pad 110a-d of the plurality of well pads 110 may include oilfield equipment 114a-d for drilling and/or production operations, as well as a man camp 120a-d where operators stationed at the well pad 110a-d live. The man camps 120a-d include showers, toilets, sinks, kitchens, etc., which all produce wastewater (or "sewage") for delivery to the centralized wastewater treatment system 100 as influent.

Wastewater from the man camps 120a-d is stored in one or more septic tanks 125a-d located on-site at the well pads 110a-d at the remote locations 108a-d. In one or more embodiments, the one or more septic tanks 125a-d may be enclosed receptacle or storage vessel that can be disposed above ground or in ground. In this regard, the one or more septic tanks 125a-d may be plastic. In one or more embodiments, each septic tank 125 may have a capacity of 200-500 gallons. Each septic tank 125 may include one or more sensors 127 to measure the volume of wastewater collected in the septic tank 125, or otherwise, a condition of the wastewater flowing into the septic tank 125. In one or more embodiments, each sensor 127 is coupled to a wireless transceiver 128 at the well pad 110 to transmit the measured volume, or condition, of the wastewater back to the centralized treatment facility 105, which likewise may include a transceiver 128 to allow wireless communication therebetween.

As used herein, geographic area 115 may be an oilfield or oilfield lease having a plurality of wells 116 disposed therein. In this regard, the geographic area 115 may be a single oilfield or multiple oilfields. The geographic area 115 may be defined by a single oilfield lease or multiple oilfield leases. Likewise, as used herein, a well pad 110 has at least one well 116 and a man camp 120 disposed to support oilfield equipment 114 adjacent to or in the vicinity of the man camp 120, where such oilfield equipment 114 may include drilling rigs, workover rigs, wellheads, production equipment, fracking equipment or the like. The man camp 120 in turn has at least one septic tank 125.

The average man camp typically generates about 500-2,000 gallons of wastewater per day. During peak operation, however, each man camp 120a-d can generate up to 3,000-4,000 gallons of wastewater per day. A large percentage of this wastewater may be generated within a 3-4 hour window each day, such as, for example, at the end of the day or at the end of a shift when the operators use the showers and kitchen.

As discussed above, traditional mobile wastewater treatment systems servicing individual oilfield well pads often have difficulty balancing these high-flow periods because they typically do not employ full or complete primary treatment processes to balance the flow and water quality (i.e., solid settlement and equalization tanks).

In one or more embodiments of the centralized wastewater treatment system 100, at determined times or capacities, as will be discussed in further detail below, the septic tanks 125a-d are at least partially drained of wastewater and the wastewater is transferred to the centralized treatment facility 105 via a transport mechanism 126. In one or more embodiments, transport mechanism 126 may be a wastewater transport vehicle 126a, such as tank truck.

As will also be discussed in more detail below, the centralized treatment facility 105 is located at a central location 106 within the geographic area 115, the central location 106 being geographically optimized within the geographic area 115 in order to service the plurality of well pads 110 as efficiently as possible. For example, in some embodiments, each of a plurality of well pads 110a-d may be a select distance $D_{a-d}$ from the centralized treatment facility 105, where distance D ranges between a minimum distance $D_{min}$ and a maximum distance $D_{max}$ in order to optimize the overall operations of the centralized wastewater treatment system 100. As described above, the plurality of oilfield well pads 110 within the geographic area 115 are each at a remote location 108a-d so as to be spaced apart from, or remote from, the centralized treatment facility 105, and additionally, may be spaced apart from each other as well.

As will be discussed, optimization can vary between the centralized wastewater treatment system 100 and each well pad 110 and may depend on the amount of wastewater generated by a particular well pad 110, the terrain within a geographic area 115 between any given well pad 110 and the centralized treatment facility 105, and the available transport mechanism 126, among other things. Thus, each well pad 110a-d may be spaced apart from the centralized treatment facility 105 a distance $D_a$, $D_b$, $D_c$ and $D_d$, where these individual distances may differ based on optimization. For example, well pad 110a may produce a larger amount of wastewater than well pad 110c, and thus, the distance $D_a$ may be selected to be shorter than the distance $D_c$. In another example, the terrain between well pad 110b and centralized treatment facility 105 may be more rugged and difficult to traverse than terrain between well pad 110d and centralized treatment facility 105, and thus, the distance $D_b$ may be selected to be shorter than the distance $D_d$. In some embodiments, distance D ranges between at least 0.5 miles and no greater than 50 miles for each of at least three well pads 110. In some embodiments, distance D ranges between at least 3 miles and no greater than 20 miles for each of at least three well pads 110. In some embodiments, distance D is at least 1 mile for each of at least three well pads 110.

The centralized treatment facility 105 utilizes transportable components so as to be semi-permanent (as compared to inground tanks and permanent infrastructure), such that it can be removed or relocated at a future time. In this regard, it will be appreciated that as additional well pads 110 are developed within a geographic area 115, it might be desirable to move centralized treatment facility 105 to maintain an optimized location with respect to all of the well pads 110 within the geographic area 115. In other words, the addition of one or more new well pads 110 to the geographic area 115 changes the original optimization criteria utilized to select the original first location 106 for the centralized treatment facility 105. Being transportable, the centralized treatment facility 105 may be moved to a new centralized location to accommodate the new well pads 110. This is particularly desirable in the development of new oil fields where new well pads 110 may be deployed to better access underground hydrocarbons.

The centralized treatment facility 105 of the disclosure includes both a primary treatment system 132 and a secondary treatment system 134. It will be appreciated that while prior art man camps may include all or a portion of the primary treatment system 132, because of the low wastewater volumes at any given man camp, it is not economically feasible to include a secondary treatment system 134 because such a secondary treatment system 134 requires a minimum throughput of wastewater, particularly those secondary treatment systems that are membrane treatment systems utilizing a membrane for filtration, such as membrane bioreactor (MBR) systems and membrane aerated biofilm reactor (MABR) systems. Thus, in one or more embodiments, the secondary treatment system 134 is a membrane treatment system. In any event, primary treatment system 134 includes at least a solid settlement tank(s) 135, an equalization tank(s) 140, and a solids screen(s) 145, while secondary treatment system 134 includes at least a membrane treatment system 150, such as MBR or MABR, and an effluent storage tank(s) 155.

In one or more embodiments of primary treatment system 132, there may be one or more of each of the solid settlement tank 135, the equalization tank 140, and the solids screen 145. In one or more embodiments of secondary treatment system 134, there may be one or more of the membrane treatment systems 150 and/or the effluent storage tank 155. The solid settlement tank 135, the equalization tank 140, and the solids screen 145 together perform a primary treatment process with respect to the influent received from the septic tanks 125a-d. In one or more embodiments, the solid settlement tank 135, the equalization tank 140, and the solids screen 145 forming the primary treatment system 132 may be combined in a single tank or apparatus.

It will be appreciated that because the primary treatment system 132 described herein is disposed to receive and treat larger volumes of influent than would be produced at any one well pad, the components of the primary treatment system 132, in particular, the solid settlement tank(s) 135 and equalization tank(s) 140, can have a significantly greater capacity for receiving and handling influent when compared to primary treatment equipment of the prior art that might be disposed at an individual well pad. Thus, each septic tank 125 may be defined to have a total capacity for storing wastewater, such as, for example, 5000 gallons for an expected daily wastewater storage of 500-3000 gallons. In such embodiments, the capacity of the solid settlement tank(s) 135 and/or the equalization tank(s) 140 is greater than the combined total capacity of at least two or more of the septic tanks 125. This larger capacity permits wastewater from a plurality of well pads 110 and septic tanks 125 to be combined and processed simultaneously which, in turn, results in improved treatment of the influent when compared to primary treatment equipment that might be disposed at an individual well pad.

In one or more embodiments, the total capacity of the solid settlement tank(s) 135 may be, for example, at least 20,000 gallons, which is greater than the total solid settlement tank capacity commonly found at individual well pads. Likewise, in one or more embodiments, the total capacity of the equalization tank(s) 140 may be, for example, at least 20,000 gallons, which is greater than the total equalization tank capacity commonly found at individual well pads. In this regard, the solid settlement tank(s) 135 and/or the equalization tank(s) 140 may include one or more sensors 127 to measure a condition of the liquid therein.

The effluent storage tank(s) 155 are in fluid communication with an effluent spray system 160. In one or more embodiments, effluent spray system 160 may be an effluent sprinkler system 160a, such as nozzles, water gun(s), jets, or apertured conduit, which may be positioned adjacent the centralized treatment facility 105 and dispose to spray effluent from the centralized treatment facility 105 on the ground about the centralized treatment facility 105 for purposes of dust control or irrigation of agricultural crops. In other embodiments, effluent spray system 160 may be one or more effluent spray vehicles 160b, such as a tank truck, disposed to receive and transport a volume of effluent to another location for spraying on the ground, such as for purposes of dust control or irrigation.

In some embodiments, effluent spray vehicles 160b may return to the one or more of the well pads 110a-d and spray the effluent from centralized treatment facility 105 on the ground around one or more well pads 110 to control dust. In other embodiments, effluent spray vehicles 160b may be utilized to spray roads (not shown) utilized to access the well pads 110 or within geographic area 115. In this way, the effluent may be utilized back at the one or more remote locations 108 from which wastewater was originally obtained. It will be appreciated that the one or more wastewater transport vehicles 126a used to collect wastewater as described herein are different from the one or more effluent spray vehicles 160b as described herein so as not to contaminate the effluent produced by centralized treatment facility 105. In one or more embodiments, the wastewater transport vehicles 126a may be equipped with multiple separate tanks such that the same wastewater transport vehicles 126a can transport both wastewater and effluent in the separate tanks.

Figure 2:
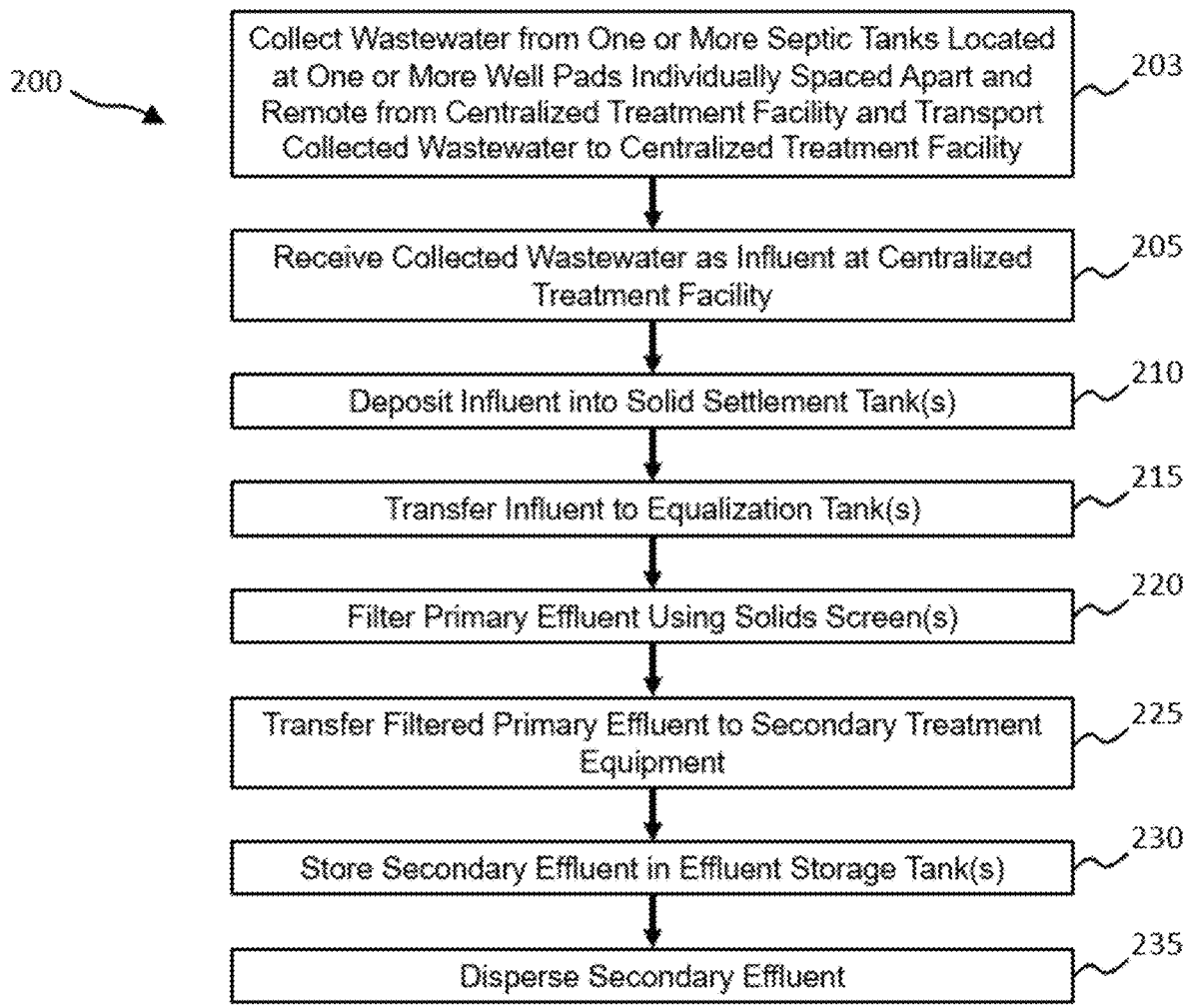
FIG. 2 is a flow chart illustrating a method of treating influent at the centralized treatment facility of FIG. 1, according to one or more embodiments of the present disclosure.

Referring to FIG. 2, with continued reference to FIG. 1, a method 200 of operation of the centralized wastewater treatment system 100 is provided according to one or more embodiments. As discussed above, at determined times or capacities, wastewater from one or more of the septic tanks 125a-d at each well pad 110a-d is collected. The frequency with which wastewater from each individual septic tank 125a-d is collected may vary depending on the demand for water at each well pad 110a-d or the production of wastewater at each well pad 110a-d. When a well pad 110a-d is at peak operation, for example, the demand for water will increase and hence, the resulting volume of wastewater produced will increase.

In one or more embodiments, one or more well pads 110a-d include at least one sensor, such as sensor 127, to measure water usage, wastewater production, or a related characteristic or condition. A signal based on the measurements made by the sensor 127 may be transmitted to the centralized treatment facility 105 or another dispatch facility in order to prompt a wastewater transport vehicle 126a to be sent to the well pad 110 to collect influent from a septic tank 125. For example, the sensor 127 can measure the volume of wastewater collected in a septic tank 125 and once the septic tank volume has reached a predetermined amount, the aforementioned signal may be transmitted to initiate movement of the wastewater to the centralized treatment facility 105 by wastewater transport vehicles 126a.

Thus, at step 203 of the method 200, at least a portion of the wastewater from one or more well pads 110a-d is removed from septic tanks 125a-d and transported to the centralized treatment facility 105, where the well pads 110a-d are remote from the centralized treatment facility 105, and may be individually spaced apart from one another. In one or more embodiments all or a portion of the wastewater collected in a given septic tank 125 may be removed from the septic tank 125 for transport. In one or more embodiments, step 203 may be accomplished by transporting the wastewater by a wastewater transport vehicle 126a, such as tank truck. In one or more embodiments, a sperate wastewater transport vehicle 126a may be sent to each well pad 110 while in other embodiments, a single vehicle 126a may collect wastewater from a plurality of well pads 110 for transport to the centralized treatment facility 105.

Additionally, step 203 may include measuring a condition at one or more well pads 110 related to the wastewater at the one or more well pads 110 and generating a signal to prompt initiation of the removal and transport of at least a portion of the wastewater from the one or more well pads 110. This may include prompting a wastewater transport vehicle 126a to be sent to the well pad 110 for wastewater collection. Because the demand for and use of water at each of the well pads 110a-d may vary, the wastewater from the septic tanks 125a-d at each of the well pads 110a-d may not be removed and transported to the centralized treatment facility 105 at the same time. For example, wastewater at well pad 110a may be removed twice a day because of high volume of wastewater collected within septic tanks 125a, while wastewater at well pad 110b may be removed only every other day because of the low volume of wastewater collected within septic tanks 125b. In this regard, the hydrocarbon drilling and production activities at the two well pads 110a, 110b may be at different stages of operation thereby resulting in the difference in wastewater production. For example, well pad 110a may have active drilling operations which typically involves a large number of personnel who would in turn generate higher volumes of wastewater. In contrast, well pad 110b may be in primary production stage, which would typically require far fewer personnel on site, thereby generating much lower volumes of wastewater.

At step 205 of the method 200, the wastewater from the well pads 110a-d is received at the centralized treatment facility 105 as influent for processing. Because the demand for and use of water at each of the well pads 110a-d may vary, the influent from the various septic tanks 125a-d at each of the well pads 110a-d may not be received at the centralized treatment facility 105 at the same time. In some circumstances, however, large volumes of influent may be received at the centralized treatment facility 105 all at once. Regardless of the frequency and volume of influent received at the centralized treatment facility 105, the centralized treatment facility 105 is disposed to process the influent because of the presence of the primary treatment process, and more specifically because of the equalization tank 140, as will be discussed in more detail below, that allows the flow and composition of the influent passing through the system to be controlled.

At step 210, the influent is deposited into and received within the one or more solid settlement tank(s) 135. The solid settlement tank 135 is adapted to segregate settleable and floatable solids. The denser solids and sludge will sink to the bottom of the solid settlement tank 135, which can then be removed and stored in the solid storage tanks (not shown). The less dense and floatable solids, as well as other scum, will float to the top of the solid settlement tank 135. This layer of floatable solids and scum can also be removed and stored in the solid storage tanks, or another storage tank (not shown) separate from the denser solids.

The use of the solid settlement tank 135 as described enables the centralized wastewater treatment system 100 to accept a greater variety of influent types and qualities as compared to traditional mobile wastewater treatments systems used at individual well pads. The solid settlement tank(s) 135 as described herein enable the centralized treatment facility 105 to accept influent with more diverse contaminants and solid matter. In one or more embodiments, for example, the centralized treatment facility 105 using the solid settlement tank 135 would be able to accept stormwater, greywater, and blackwater, whereas well pad primary treatment systems of the prior art typically would not be disposed to accept these different types of wastewater due to capacity limitations and treatment limitations. Moreover, in one or more embodiments, the solid settlement tank(s) 135 as described collectively have a larger capacity than any individual septic tanks 125, thereby allowing the solid settlement tank(s) 135 to receive and begin treating wastewater from two or more well pads 110 simultaneously.

At step 215, after the dense solids and floatable solids have been removed from the influent, the influent is transferred to the equalization tank 140. The primary purpose of the equalization tank 140 is to serve as a buffer to balance the composition and/or flow velocity of the inflow of influent received from the well pads 110a-d located in the geographic area 115 and serviced by the centralized treatment facility 105. By balancing the inflow of influent received, the equalization tank 140 can deliver a flow of influent that is more consistent in composition, containing a substantially uniform composition and consistency of contaminants, to the secondary treatment equipment 150. Moreover, in one or more embodiments, the equalization tank(s) 140 as described collectively have a larger capacity than any individual septic tanks 125, thereby allowing the equalization tank(s) 140 to receive and treat wastewater from two or more well pads 110 simultaneously.

As discussed above, traditional mobile wastewater treatment systems servicing individual well pads do not typically use full primary treatment processes. In this regard, use of equalization tanks in the primary treatment process of prior art well pads is uncommon because of cost and capacity restrictions. As a result, an inconsistent flow of influent may be processed by prior art primary treatment processes at well pads to the extent such primary treatment processes are employed at all. Because biological treatment processes take time to stabilize, an inconsistent flow of influent can result in untreated/undertreated wastewater and an overall lower quality of treated wastewater, i.e., effluent.

In one or more embodiments, additional solids may be accumulated, consolidated, removed, and stored during processing in, and discharge from, the equalization tank 140. In one or more embodiments, the equalization tank 140 may also digest organic matter via anaerobic treatment processes whereby anaerobic microorganisms digest organic contaminants in the absence of oxygen. In such embodiment(s), the equalization tank 140 would be sealed. In one or more embodiments, such anaerobic treatment processes may occur in tanks separate from the equalization tank 140 and may occur before or after step 215 (i.e., before or after the influent is received within the equalization tank 140).

In one or more embodiments, the equalization tank(s) 140 may be an open-air tank and may be aerated using a mechanical mixing device or an aeration pump so that influent discharged from the equalization tank(s) 140 are more homogenous than the wastewater received in step 205. The aeration of the equalization tank 140 promotes suspension of the contaminants in the influent and maintains a consistent distribution of the contaminants in the influent. The equalization tank 140 processes the influent and discharges primary effluent. The consistent distribution of contaminants in the flow of primary effluent to the secondary treatment equipment 150 promotes more efficient processing of the influent in the secondary treatment process and improves the quality of the resultant secondary effluent.

At step 220, the flow of primary effluent discharged from the equalization tank 140 is passed through and filtered by the solids screen 145 before being received by the secondary treatment system 134. The solids screen 145 removes additional solid contaminants from the primary effluent. In one or more embodiments, there are multiple solids screens 145 with progressively smaller through-holes. In one or more embodiments, the solids screen(s) 145 is located within the equalization tank 140, while in other embodiments, the solids screen(s) 145 may be separate from the equalization tank(s) 140. In one or more embodiments, the additional solid contaminants are removed and stored in solid storage tank(s) (not shown).

At step 225, the primary effluent, which has been filtered, equalized, and discharged from the equalization tank 140, is directed to the secondary treatment system 134 and, more particularly, to the secondary treatment equipment 150. The secondary treatment equipment 150 includes tankage and aeration equipment designed to biologically treat the influent from the primary treatment system 132. In one or more embodiments, the biological treatment includes oxidizing the primary effluent. The aeration equipment may include mechanical mixing equipment, aeration pumps and blowers, or other aeration equipment known in the art. The secondary treatment equipment 150 is adapted to digest soluble organic matter and suspended solids, filter finer solids, perform nitrification processes to remove ammonia from the primary effluent by converting it to nitrate, and, where required by regulation, perform denitrification processes to subsequently reduce the resultant nitrate to nitrogen gas. In one or more embodiments, the nitrification and denitrification processes may be performed simultaneously. After being processed by the secondary treatment equipment 150, the primary effluent can be considered secondary effluent.

In one or more embodiments, the secondary treatment equipment 150 may perform aerobic treatment processes and/or biofiltration processes. In both processes, aerobic microorganisms are used to breakdown and digest organic contaminants in the primary effluent.

In one or more embodiments, the secondary treatment equipment 150 includes a membrane bioreactor (MBR) system, which includes a membrane filter. In one or more embodiments the secondary treatment equipment 150 includes a membrane aerated biofilm reactor (MABR) system. In one or more other embodiments, the secondary treatment equipment 150 utilizes other types of membranes or filters through which biologically treated water is passed. Multiple of these systems or other such systems known in the art can be used at the centralized treatment facility 105 to easily scale-up the centralized treatment facility 105 as needed in order to service additional well pads 110. Notably, in the case of any type of filtration system as described with respect to step 225, a minimum throughput of influent is required for operation of secondary treatment equipment 150. Such throughput is typically 10,000-20,000 gallons/day. Given this throughput requirement, such systems would not be deployed at individual well pads since well pads typically only produced around 500-3,000 gallons/day of wastewater. For this reason, wastewater treated on site at typical well pads cannot achieve the same effluent quality level or level of purification as can be achieved by the centralized treatment facility 105.

At step 230, the secondary effluent is discharged from the secondary treatment equipment 150 and is stored in the effluent storage tank 155. The effluent storage tank 155 can be stored onsite at the central location 106 or can be store offsite and remote from the centralized treatment facility 105.

At step 235, the secondary effluent is dispersed. The secondary effluent can be dispersed in a number of ways.

First, the secondary effluent may used in agricultural irrigation and/or dust control applications. It will be appreciated that because centralized treatment facility 105 is typically located in remote areas, there is no infrastructure, such as a network of pipes, pumps, reservoirs, for disposing of or removing the secondary effluent. Rather, as described above, the secondary effluent may be dispersed by spraying it on ground for dust control or agricultural irrigation within geographic area 115. In this regard, the secondary effluent may be sprayed adjacent to or in the vicinity of centralized treatment facility 105 utilizing an effluent spray system 160a disposed adjacent to or in the vicinity of the centralized treatment facility 105, such as within 0.5 miles of the centralized treatment facility 105. In other embodiments, the effluent may be loaded into one or more effluent spray vehicles 160b disposed to receive and transport a volume of effluent to another location for spraying on the ground.

The secondary effluent may also be returned or sold back to the individual well pads 110a-d to be used for downhole operations and hydraulic fracturing. As discussed above, the secondary effluent is dispersed via one or more effluent spray vehicles 160b, which are different from the wastewater transport vehicles 126a so as to not contaminate the secondary effluent. Regardless of whether the secondary effluent is utilized for dust control, irrigation, or drilling or production operations, it will be appreciated that the secondary effluent may be sold for these purposes. Thus, from an economic standpoint, the operator of centralized wastewater treatment system 100 can receive compensation both for removal and treatment of the wastewater and also for delivery of the secondary effluent for the purposes described above, it being understood that it is common for well pad operators to purchase water for these purposes.

It will be appreciated that because the wastewater collected from well pads 110 as described herein has been treated with both a primary treatment system 132 and a secondary treatment system 134, it is of a sufficient quality that it can be disposed of in this manner. Thus, the centralized treatment facility 105 permits wastewater from well pads 110 to be treated to a higher quality than may occur at prior art well pads, and thus the resulting effluent can be re-used for various operations associated with the well pads 110.

Figure 3:
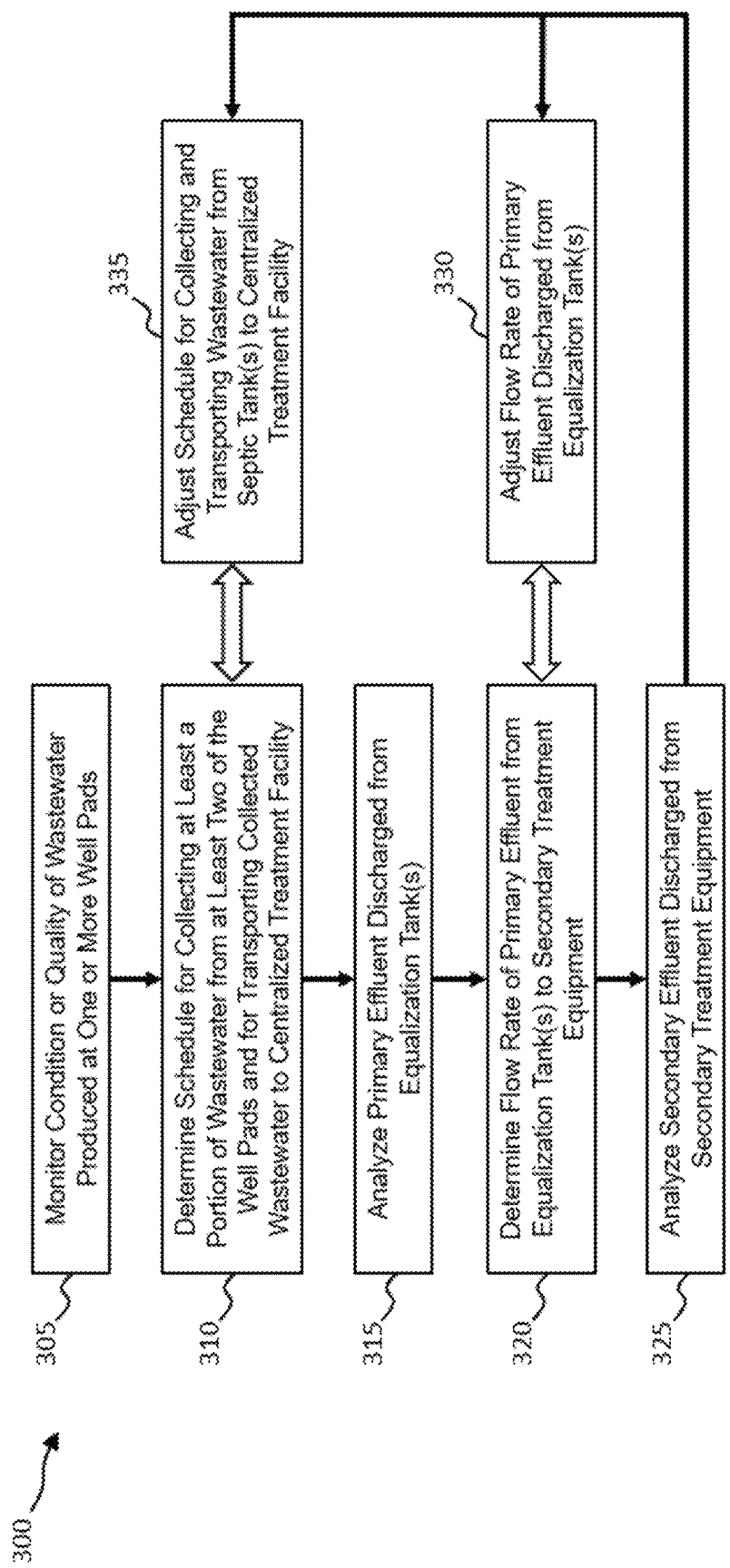
FIG. 3 is a flow chart illustrating a method of optimizing the method of FIG. 2, according to one or more embodiments of the present disclosure.

Referring to FIG. 3, with continued reference to FIGS. 1 and 2, a method 300 of optimizing the centralized wastewater treatment system 100, including the method 200 as shown and described with respect to FIG. 2, is provided according to one or more embodiments.

At step 305, a condition or quality of the wastewater produced at each of the one or more well pads 110a-d located within the geographic area 115 is monitored. In one or more embodiments, the condition monitored can be the capacity of each septic tank 125a-d of the plurality of well pads 110a-d located within the geographic area 115. In some embodiments, one or more sensors 127 may be operably connected to the septic tanks 125a-d to monitor or measure the volume of wastewater in the septic tanks 125a-d. In one or more embodiments, this data may be transmitted and stored at a control system located at the centralized treatment facility 105. In some embodiments, this data may be transmitted wirelessly with a transceiver 128.

At step 310, a schedule for collecting at least a portion of the wastewater from two or more of the well pads 110a-d, and for transporting the collected wastewater to the centralized treatment facility 105, is determined. By monitoring the capacities of the septic tanks 125a-d of the well pads 110a-d, or some other quality or condition of the produced wastewater, and analyzing that data with respect to the processing capacity of the centralized treatment facility 105, the schedule can be optimized to reduce energy consumption and promote efficient operation of the centralized treatment facility 105. Determining which septic tanks 125a-d need to be emptied, or at least partially drained, and when may largely depend on the stage of operation of each well pad 110a-d in the drilling and production process.

At step 315, the primary effluent discharged from the equalization tank 140 is monitored and analyzed. More particularly, the quality of the primary effluent, including the type, concentration, and consistency of the contaminants in the primary effluent, is analyzed in light of the processing capabilities of the secondary treatment equipment 150.

At step 320, a flow rate of the primary effluent from the equalization tank 140 to the secondary treatment equipment 150 is determined. As discussed above, biological treatment processes take time to stabilize. In addition, membrane filtration also requires a minimum amount of throughput in order to maintain desired pressures for operation. Depending on the quality of the primary effluent that is discharged from the equalization tank 140, the amount of time required by the secondary treatment equipment 150 to treat and process the primary effluent may vary.

Using the analysis of the primary effluent discharged from the equalization tank 140, the amount of time required to treat the primary effluent using the secondary treatment equipment 150 can be determined. Once the time required to treat the primary effluent using the secondary treatment equipment 150 is determined, an optimal flow rate of the primary effluent from the equalization tank 140 can be determined. The optimal flow rate of the primary effluent discharged from the equalization tank 140 promotes efficient processing of the primary effluent by exposing the primary effluent to the secondary treatment equipment 150 for the optimal amount of time required to yield the highest quality effluent possible.

At step 325, the secondary effluent discharged from the secondary treatment equipment 150 to the effluent storage tank 155 is analyzed. The secondary effluent is analyzed to determine whether the concentration of contaminants remaining in the secondary effluent satisfies governmental permitting requirements and/or governmental quality requirements and allows for the secondary effluent to be subsequently dispersed via downhole fracking, irrigation, dust control, or other permissible means of dispersing the secondary effluent.

At step 330, using the analysis of the secondary effluent discharged from the secondary treatment equipment 150, the flow rate of the primary effluent discharged from the equalization tank 140 (i.e., the determination made at step 320) is adjusted as needed to optimize the quality of the secondary effluent and improve the efficiency of the secondary treatment equipment 150. For example, if the concentration of contaminants remaining in the secondary effluent after passing through the secondary treatment equipment 150 is too high and does not satisfy permitting requirements, the flow rate of the primary effluent coming from the equalization tank 140 can be decreased such that the primary effluent is exposed to the secondary treatment equipment 150 for a longer period of time.

If, in the alternative, the concentration of contaminants remaining in the secondary effluent is well below the required limit, the flow rate of primary effluent into the secondary treatment equipment 150 may be increased to improve efficiency and increase the rate at which the primary effluent is being treated by the secondary treatment equipment 150.

At step 335, using the analysis of the secondary effluent discharged from the secondary treatment equipment 150, the schedule for collecting and transporting wastewater from each septic tank 125*a-d* of the well pads 110*a-d* to the centralized treatment facility 105 (i.e., the determination made at step 310) is adjusted as needed to improve the efficiency of the centralized wastewater treatment system 100 and of the operation of the centralized treatment facility 105.

In one or more embodiments, adjusting or updating the schedule for collecting and transporting wastewater from the septic tanks 125*a-d* to the centralized treatment facility 105 may depend solely on the capacities of the septic tanks 125*a-d* monitored at step 305. As water consumption at the man camps 120*a-d* varies (e.g., as oil production operations at the well pads 110*a-d* ramp-up or ramp-down) the schedule for collecting and transporting the wastewater from the septic tanks 125*a-d* at the man caps 120*a-d* may need to be updated in order to accommodate the increased or decreased production of wastewater in an efficient manner.

In one or more embodiments, adjusting or updating the schedule for collecting and transporting the wastewater from the well pads 110*a-d* to the centralized treatment facility 105 may depend upon, and may be adjusted simultaneously with, the adjustment of the flow rate at which the primary effluent is discharged from the equalization tank 140 (i.e., step 330). If it is determined at step 330 that the secondary treatment equipment 150 is capable of processing the primary effluent at a greater flow rate and the flow rate is subsequently increased, then the schedule for collecting and transporting wastewater from the well pads 110*a-d* may be adjusted to increase the volume of wastewater received as influent, or the rate at which the wastewater is received, at the centralized treatment facility 105. If it is determined at step 330 that the flow rate of the primary effluent from the equalization tank 140 should be reduced and the flow rate is subsequently reduced, then the schedule for collecting and transporting wastewater from the well pads 110*a-d* may be adjusted to decrease the volume of wastewater received as influent, or the rate at which the wastewater is received, at the centralized treatment facility 105.

Figure 4:
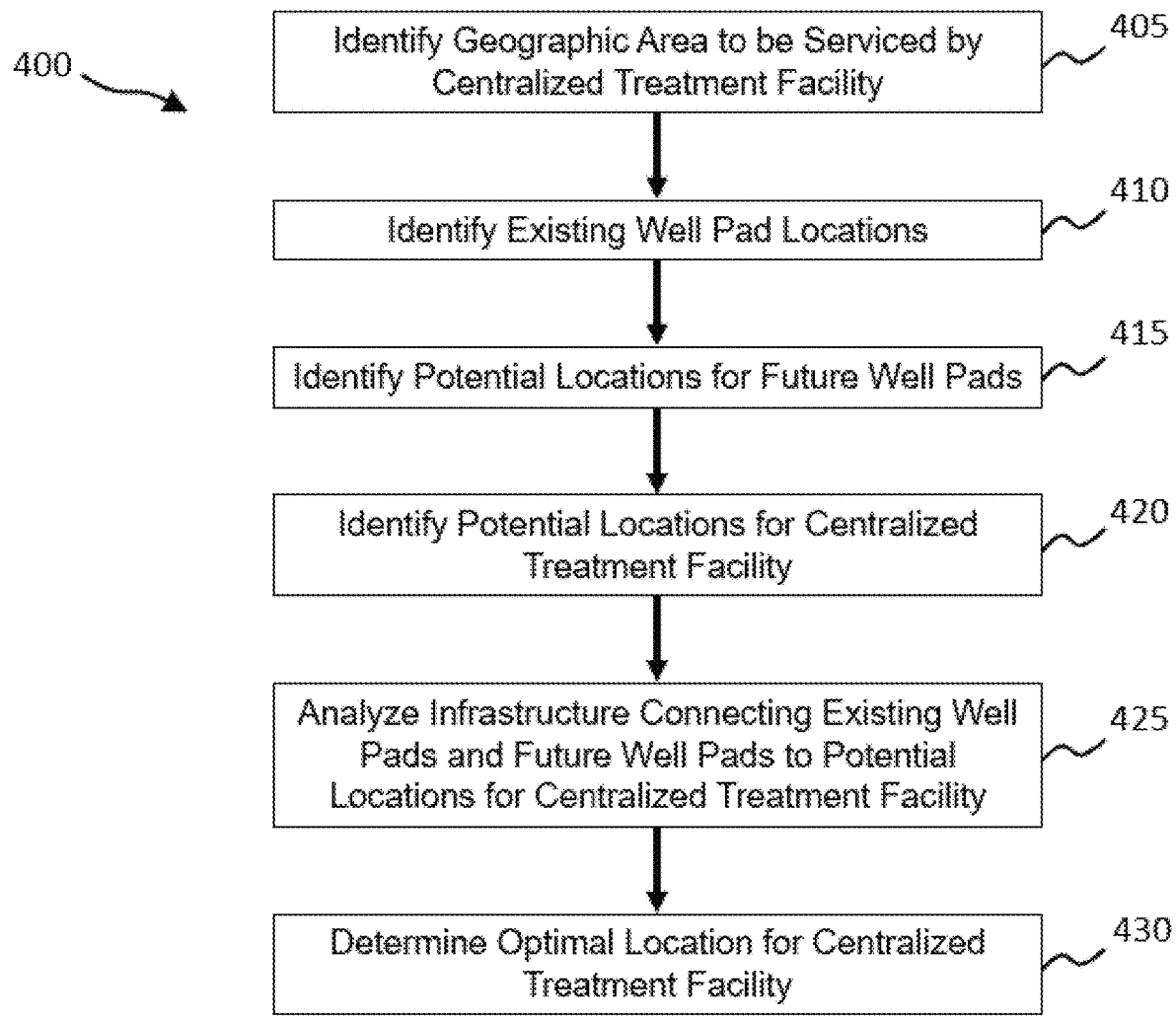
FIG. 4 is a flow chart illustrating a method of determining a central location for the centralized treatment facility of FIG. 1, according to one or more embodiments of the present disclosure.

Referring to FIG. 4, with continued reference to FIG. 1, a method 400 of determining and optimizing the central location 106 of the centralized treatment facility 105 within the geographic area 115 is provided according to one or more embodiments.

At step 405, the geographic area 115 to be serviced by the centralized treatment facility 105 is identified. As discussed above, because the wastewater produced at the plurality of well pads 110 is treated at the centralized treatment facility 105, the centralized wastewater treatment system 100, including the plurality of well pads 110 and the centralized treatment facility 105, is more easily scalable than was possible with individual mobile wastewater treatment systems. As such, the boundaries of the geographic area 115 may change as the centralized wastewater treatment system 100 is scaled.

At step 410, locations of the existing well pads 110*a-d* are identified. The existing well pads 110*a-d* are the well pads that have already been established, are located within the geographic area 115, and are producing wastewater that will be treated by the centralized treatment facility 105.

At step 415, future locations for future well pads are identified. The future locations are dependent on available leases. In one or more embodiments, the future locations are within the geographic area 115. In one or more embodiments, the future locations are outside the existing boundaries of the geographic area 115, but as discussed above, the boundaries of the geographic area 115 can change as the operations of the centralized wastewater treatment system 100 are scaled. In other words, the locations of the well pads 110*a-d* serviced, or that will be serviced, by the centralized treatment facility 105 define the bounds of the geographic area 115.

At step 420, potential locations for the centralized treatment facility 105 are identified. Like the future locations for the future well pads, the potential locations for the centralized treatment facility 105 depend upon land available to be leased and upon which the centralized treatment facility 105 can be built.

At step 425, existing infrastructure connecting the existing well pads 110*a-d* and the future locations for future well pads to the potential locations for the centralized treatment facility 105 is identified and analyzed. Alternatively, or in addition thereto, to optimize placement of the centralized treatment facility 105, topography within geographic area 115 is analyzed to determine where future infrastructure is likely to be positioned based on existing and planned future well pads. In one or more embodiments, the infrastructure includes roadways that enable the wastewater to be trucked from the well pads 110*a-d* to the centralized treatment facility 105.

The infrastructure is analyzed with respect to the locations of the existing well pads 110*a-d*, the future locations of the future well pads, and the potential locations for the centralized treatment facility 105 in order to determine, at step 430, which potential location for the centralized treatment facility 105 is the most efficient. In one or more embodiments, this analysis may include: an analysis of traffic data and navigational routes with respect to the infrastructure connecting the existing and future well pad locations and the potential locations for the centralized treatment facility 105; an analysis of the current or anticipated wastewater production of each individual well pad; and/or an analysis of the likelihood of future well pads being established at the future locations.

In one or more embodiments, the analysis of the traffic data and navigational routes may be prioritized, or given a greater weight, such that the determination, at step 430, of the central location 106 optimizes the total distance or time required to navigate from the well pads 110*a-d* to the centralized treatment facility 105. In such embodiment(s), the centralized treatment facility 105 may be substantially centered within the geographic area 115. In one or more embodiments, the wastewater production at each of the well pads 110*a-d* may be given greater weight in the analysis performed at step 425 such that the potential locations for the centralized treatment facility 105 are evaluated based on proximity to well pads that produce higher volumes of wastewater. In still other embodiments, greater weight may be given to the future locations for the future well pads when performing the analysis at step 425 such that the determination of the central location 106 of the centralized treatment facility 105 is optimized with respect to the anticipated expansion, or scaling-up, of oilfield operations and of the centralized wastewater treatment system 100. The analysis performed at step 425 may take into account any one or more of the above-mentioned factors and may assign various weights to each factor depending on the requirements of the application.

Optimizing the central location 106 of the centralized treatment facility 105 within the geographic area 115 promotes improved energy efficiency of the centralized wastewater treatment system 100 by reducing the energy consumption required to transport the wastewater from the well pads 110*a-d* to the centralized treatment facility 105.

As disclosed herein, the centralized wastewater treatment system 100 is more efficient than traditional mobile wastewater treatment systems. The centralized wastewater treatment system 100 is more energy efficient because rather than operating an individual mobile wastewater treatment system at each well pad 110*a-d*, the centralized treatment facility 105 can receive the wastewater produced at each of the well pads 110*a-d* and treat all of the wastewater together using a single system.

The centralized wastewater treatment system 100 is also more cost effective for the same reasons. Rather than purchasing or renting a traditional mobile wastewater treatment system for every single well pad 110*a-d*, only the centralized treatment facility 105 needs to be established in the centralized wastewater treatment system 100. In addition, operating the centralized treatment facility 105 is more cost effective because only one permit is required, whereas previously a permit was required for each mobile wastewater treatment system in operation. As a result, the overall cost of treating the wastewater produced within the geographic area 115 is reduced for both owners and customers.

The centralized wastewater treatment system 100 is also more efficient because it is more versatile. Because the wastewater is consolidated and processed at the central location 106, it is more economically feasible to introduce the primary treatment processes, including the solid settlement tank 135, the equalization tank 140, and the solids screen 145, at the centralized treatment facility 105. Because the centralized treatment facility 105 uses the primary treatment processes, a wider range of types and qualities of wastewater are able to be processed by the centralized wastewater treatment system 100 than was previously able to be processed using the individual mobile wastewater treatment systems.

The centralized wastewater treatment system 100 also yields higher quality effluent because of the use of the primary treatment processes at the centralized treatment facility 105. The use of the primary treatment processes in combination with the secondary treatment processes improves the treatment of the influent and results in the secondary effluent having a lower concentration of contaminants. The use of the equalization tank 140 additionally contributes to the higher quality of effluent exported from the centralized treatment facility 105 because the equalization tank 140 enables the flow of primary effluent to be controlled and maintained at a constant rate, which enables the biological processes taking place in the secondary treatment equipment 150 to perform more efficiently and provide more consistent treatment of the primary effluent received.

The centralized wastewater treatment system 100 is also more efficient than traditional individual mobile wastewater treatment systems because the centralized wastewater treatment system 100 is more easily scalable. The centralized treatment facility 105 itself is more readily scalable because it is a standalone facility capable of treating the plurality of well pads 110. As the number of well pads 110 serviced by the centralized treatment facility 105 increase, the capacity of the centralized treatment facility 105 can also be increased. The future well pads can be established in various spaced-apart locations within the geographic area 115 and remote from the centralized treatment facility 105; however, the only modifications required to be made to the centralized wastewater treatment system 100, if any, to accommodate the additional wastewater production would be at the centralized treatment facility 105. Because modifications would only need to be made at the centralized treatment facility 105, it is much easier to adjust for and accommodate increases in wastewater production from the well pads 110. Also, because the well pads 110 will no longer need mobile wastewater treatment systems, the obstacles and costs deterring the establishment of new well pads, including acquiring new permits for sewage treatment, are reduced or eliminated. Thus, the centralized treatment facility 105 makes it easier to scale-up hydrocarbon recovery operations in the geographic area 115 by more readily installing new well pads and man camps within the geographic area 115.

Figure 5:
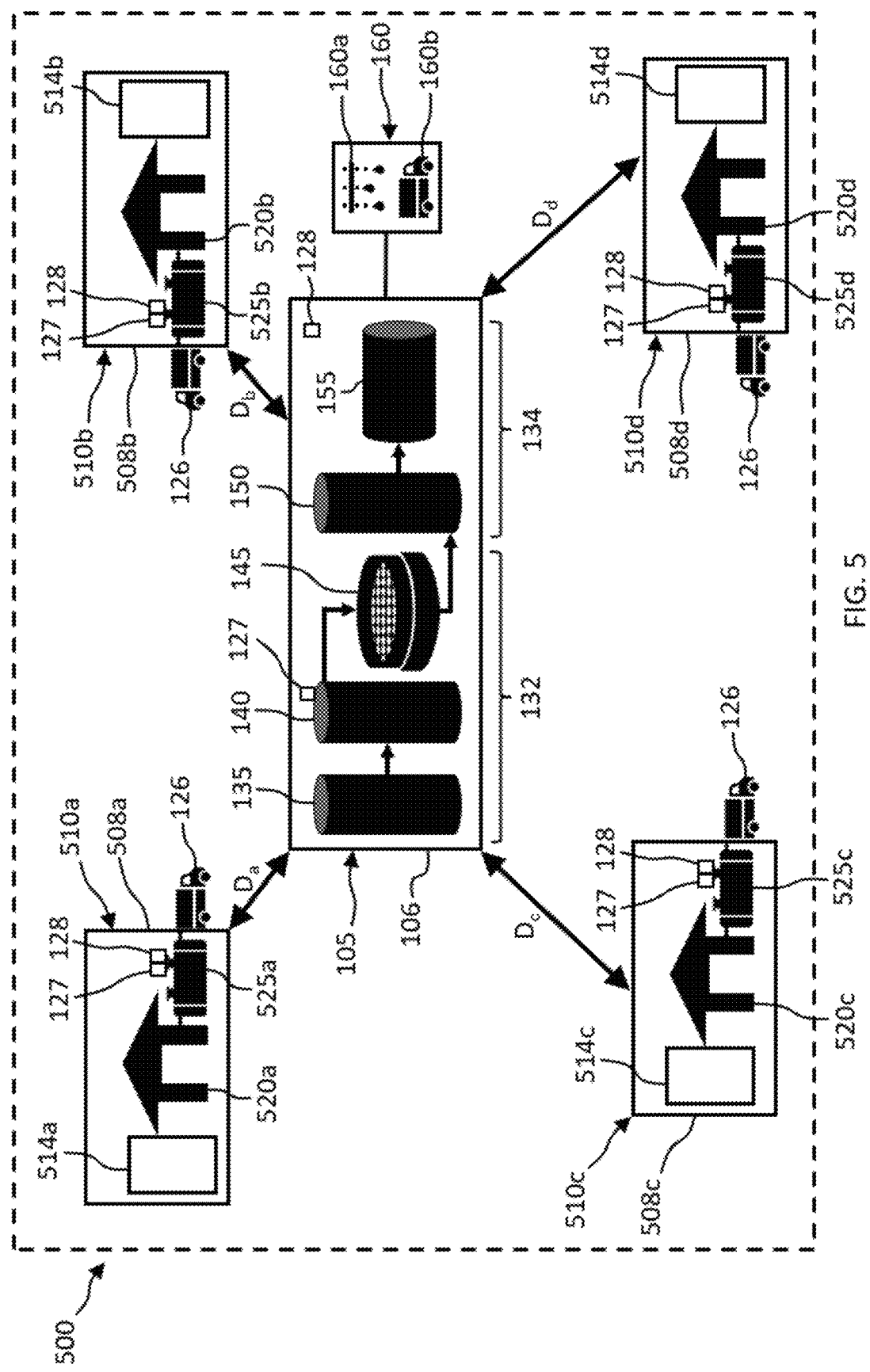
FIG. 5 is an illustration of a centralized sewage treatment system including a centralized treatment facility adapted to service a plurality of temporary housing facilities, according to one or more embodiments of the present disclosure.

Finally, with respect to FIG. 5, while centralized wastewater treatment system 100 has been described above in relation to man camps 120 and associated septic tanks 125 supporting the man camps 120 for oil and gas operations (see FIG. 1), it will be appreciated that centralized wastewater treatment system may also be used to support other types of remote, temporary structures having plumbing systems that are not connected to local water utilities.

In FIG. 5, a centralized wastewater treatment system 500 is shown supporting at least three and in some cases, a plurality, of remote locations 508*a-d*, each remote location 508 having temporary housing facilities 520 for construction activities, agricultural activities, industrial activities or the like, where each temporary housing facility 320 has one or more associated septic tanks 525. In the illustrated embodiment, each temporary housing facility 520 is located at a remote site 510, such as a farm, construction site, or industrial site. Thus, in one embodiment, during harvesting season, at least three and in some cases, a plurality, of farms 510 may each include temporary housing facilities 520*a-d* for workers, where each temporary housing facility 520 at each farm 510 may include sleeping structures and associated plumbing systems. The centralized wastewater treatment system 500 is positioned to provide wastewater treatment for each of a plurality of temporary housing facilities 520a-d for personnel supporting the agricultural activities, where each temporary housing facility 520 includes one or more sleeping structures along with plumbing systems requiring one or more septic tanks 525.

In one or more other embodiments, at least three and in some cases, a plurality, of construction sites 510 may each include temporary housing facilities 520a-d for workers, where each temporary housing facility 520 at each construction site 510 may include sleeping structures and associated plumbing systems. The centralized wastewater treatment system 500 is positioned to provide wastewater treatment for each of the plurality of temporary housing facilities 520a-d for personnel supporting the construction activities, where each temporary housing facility 520 includes one or more sleeping structures along with plumbing systems requiring one or more septic tanks 525.

In one or more other embodiments, at least three and in some cases, a plurality, of industrial sites 510 may each include temporary housing facilities 520a-d for workers, where each temporary housing facility 520 at each industrial site 510 may include sleeping structures and associated plumbing systems. The centralized wastewater treatment system 500 is positioned to provide wastewater treatment for each of the plurality of temporary housing facilities 520a-d for personnel supporting the industrial activities, where each temporary housing facility 520 includes one or more sleeping structures along with plumbing systems requiring one or more septic tanks 525. In one or more embodiments, each remote site 510 may include agricultural fields 514 or industrial facilities 514 or construction 514, as the case may be, that is the focus of the personnel occupying the temporary housing. In other embodiments, at least three and in some cases, a plurality, of remote sites 510 having temporary housing facilities 520 may be utilized for other purposes, such as housing military personnel or other groups of people in remote locations.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A system for treating wastewater arising from a plurality of oilfield well pads, comprising:
    an oilfield having a plurality of hydrocarbon wells disposed therein, a first oilfield well pad having at least one of the plurality of hydrocarbon wells, and a second oilfield well pad having at least one of the plurality of hydrocarbon wells;
    a plurality of sensors;
    a plurality of distributed transceivers, each distributed transceiver in wireless communication with a central transceiver disposed at a centralized treatment facility;
    the first oilfield well pad at a first remote location, the first oilfield well pad comprising:
        a first man camp;
        a first septic tank having a total wastewater capacity and containing wastewater collected from the first man camp;
        a first transceiver of the plurality of distributed transceivers; and
        a first sensor of the plurality of sensors, the first sensor of the plurality of sensors associated with the first septic tank and electrically coupled with the first distributed transceiver, the first distributed transceiver adapted to transmit to the central transceiver first data associated with a volume of wastewater contained in the first septic tank;
    the second oilfield well pad at a second remote location, the second oilfield well pad comprising:
        a second man camp;
        a second septic tank having a total wastewater capacity and containing wastewater collected from the second man camp, wherein the first oilfield well pad is spaced apart from the second oilfield well pad;
        a second transceiver of the plurality of distributed transceivers; and
        a second sensor of the plurality of sensors, the second sensor of the plurality of sensors associated with the second septic tank and electrically coupled with the second distributed transceiver, the second distributed transceiver adapted to transmit to the central transceiver second data associated with a volume of wastewater contained in the second septic tank; and
    the centralized treatment facility at a central location determined based on the first remote location and the second remote location and spaced apart from each of the oilfield well pads a distance of at least 0.5 miles and no more than 50 miles, the centralized treatment facility being adapted to receive and treat wastewater from each of the oilfield well pads and comprising:
        a primary treatment system at the central location, the primary treatment system comprising a solid settlement tank and an equalization tank in fluid communication with the solid settlement tank, the primary treatment system being adapted to receive and treat wastewater from the first septic tank and the second septic tank simultaneously;
        a secondary treatment system at the central location and in fluid communication with the primary treatment system; and
        the central transceiver, wherein the central transceiver is adapted to receive the first data and the second data from the first sensor and the second sensor, respectively.

2. The system of claim 1,
    wherein the equalization tank has a total capacity greater than the combined total wastewater capacity of the first and second septic tanks, and
    wherein the equalization tank is adapted to receive and equalize the wastewater from the first and second septic tanks simultaneously.

3. The system of claim 2, wherein the secondary treatment system comprises a membrane bioreactor (MBR) system.

4. The system of claim 2, wherein the secondary treatment system comprises a membrane aerated biofilm reactor (MABR) system.

5. The system of claim 1, further comprising a wastewater transport vehicle and an effluent spray vehicle.

6. The system of claim 1, further comprising an effluent spray system in fluid communication with the secondary treatment system.

7. The system of claim 6, wherein the secondary treatment system comprises one or more effluent storage tanks in fluid communication with the effluent spray system.

8. The system of claim 1, further comprising a third oilfield well pad having at least one of the plurality of hydrocarbon wells, a third man camp, and a third septic tank.

9. A system for treating wastewater arising from a plurality of oilfield well pads, comprising:
- a first oilfield well pad at a first remote location, the first oilfield well pad having (i) a one or more wells, (ii) a man camp, (iii) one or more septic tanks each with a sensor disposed to measure a condition of at least one of the one or more septic tanks at the first oilfield well pad, and (iv) a transceiver electrically coupled to the sensor of each of the one or more septic tanks of the first oilfield well pad;
- a second oilfield well pad at a second remote location, the second oilfield well pad having (i) one or more wells, (ii) a man camp, (iii) one or more septic tanks each with a sensor disposed to measure a condition of at least one of the one or more septic tanks at the second oilfield well pad, and (iv) a transceiver electrically coupled to the sensor of each of the one or more septic tanks of the second oilfield well pad;
- a third oilfield well pad at a third remote location, the third oilfield well pad having (i) one or more wells, (ii) a man camp, (iii) one or more septic tanks with a sensor disposed to measure a condition of at least one of the one or more septic tanks at the third oilfield well pad, and (iv) a transceiver electrically coupled to the sensors of each of the one or more septic tanks of the third oilfield well pad; and
- a centralized treatment facility at a central location determined based on the first remote location, the second remote location, and the third remote location and spaced apart from each of the oilfield well pads a distance of at least 0.5 miles and no more than 50 miles, the centralized treatment facility comprising:
  - a wastewater transport vehicle for collecting, according to a schedule and a navigational route associated with the schedule, wastewater from the one or more septic tanks of each of the plurality of oilfield well pads and transporting the collected wastewater to the centralized treatment facility;
  - a primary treatment system at the central location, the primary treatment system comprising a solid settlement tank and an equalization tank in fluid communication with the solid settlement tank, the primary treatment system being adapted to receive and treat wastewater from each of the one or more septic tanks from each of the oilfield well pads simultaneously;
  - a secondary treatment system at the central location and in fluid communication with the primary treatment system, the secondary treatment system having a membrane treatment system having a minimum daily throughput capacity of at least 10,000 gallons per day;
  - an effluent storage tank in fluid communication with the membrane treatment system;
  - an effluent spray vehicle in fluid communication with the effluent storage tank to collect a portion of effluent from the effluent storage tank and return the portion of effluent to any one or more of the plurality of oilfield well pads, the effluent spray vehicle having a plurality of nozzles for dispersal of effluent at the any one or more of the plurality of oilfield well pads; and
  - a central transceiver at the central location and in wireless communication with the transceivers of the first, second and third oilfield well pads to receive data associated with the condition of the one or more septic tanks of each of the plurality of oilfield well pads.

10. The system of claim 9, wherein the membrane treatment system is selected from the group consisting of a membrane bioreactor (MBR) system and a membrane aerated biofilm reactor (MABR) system.

11. The system of claim 10, wherein the centralized treatment facility further comprises an effluent spray system including an effluent sprinkler system fluidically coupled to the effluent storage tank, wherein the effluent sprinkler system is disposed in the vicinity of the centralized treatment facility.

12. The system of claim 9, wherein the effluent spray vehicle comprises a tank truck with a plurality of nozzles.

13. The system of claim 9, wherein the wastewater transport vehicle and the effluent spray vehicle are a single vehicle, the single vehicle having two separate tanks with one for wastewater and the other for the portion of effluent.

14. A method for treating wastewater arising from a plurality of oilfield well pads, comprising:
- storing wastewater from a first man camp in a first septic tank at a first well pad spaced apart from a centralized treatment facility at least 0.5 miles;
- monitoring, using a first sensor electrically coupled to a first transceiver and associated with the first septic tank, a condition of the wastewater stored in the first septic tank;
- transmitting, by the first transceiver to a central transceiver associated with the centralized treatment facility, first data associated with the condition of the wastewater stored in the first septic tank;
- storing wastewater from a second man camp in a second septic tank at a second well pad spaced apart from the centralized treatment facility at least 0.5 miles;
- monitoring, using a second sensor electrically coupled to a first transceiver and associated with the second septic tank, a condition of the wastewater stored in the second septic tank;
- transmitting, by the second transceiver to the central transceiver associated with the centralized treatment facility, second data associated with the condition of the wastewater stored in the second septic tank;
- determining, at the centralized treatment facility and using the first data and the second data, a schedule for collecting at least a portion of the wastewater stored in each of the first septic tank and the second septic tank;
- collecting, according to the schedule and using a wastewater transport vehicle, at least the portion of the wastewater stored in each of the first septic tank and the second septic tank and transporting the collected wastewater to the centralized treatment facility;
- introducing the collected wastewater into a primary treatment system at the centralized treatment facility as influent, by directing the collected wastewater into a solid settlement tank and an equalization tank;
- treating the influent with the primary treatment system, including the solid settlement tank and the equalization tank, to segregate settleable and floatable solids at the centralized treatment facility and thereafter balance a composition of the influent to produce primary effluent;
- introducing the primary effluent into a secondary treatment system at the centralized treatment facility;
- treating the primary effluent with the secondary treatment system to produce secondary effluent;

returning, using an effluent spray vehicle, at least a portion of the secondary effluent to one or more of the plurality of oilfield well pads; and dispersing at least the portion of the secondary effluent on the ground at the one or more of the plurality of oilfield well pads.

15. The method of claim 14, wherein dispersing at least the portion of the secondary effluent includes spraying at least the portion of the secondary effluent to control dust.

16. The method of claim 14, wherein dispersing at least the portion of the secondary effluent includes spraying at least the portion of the secondary effluent to irrigate crops.

17. The method of claim 14, further comprising positioning the centralized treatment facility a distance of at least 0.5 miles from each well pad and no more than 50 miles from each well pad.

18. The method of claim 14, wherein treating the primary effluent with the secondary treatment system comprises introducing the primary effluent into a membrane bioreactor (MBR) system.

19. The method of claim 14, wherein treating the primary effluent with the secondary treatment system comprises introducing the primary effluent into a membrane aerated biofilm reactor (MABR) system.

20. The method of claim 14, wherein introducing the collected wastewater comprises combining the collected wastewater from at least two man camps for treatment in the primary treatment system and simultaneously treating the combined wastewater.

21. The method of claim 14, wherein dispersing at least the portion of the secondary effluent includes utilizing at least the portion of the secondary effluent for fracking operations at the one or more of the plurality of oilfield well pads.

22. The method of claim 14, wherein at least one of the type, concentration, and consistency of the contaminants in the wastewater from the first septic tank and from the second septic tank differ.

23. The method of claim 14,
wherein the condition of the wastewater stored in the first septic tank includes the volume of the wastewater in the first septic tank;
wherein the condition of the wastewater stored in the second septic tank includes the volume of the wastewater in the second septic tank; and
wherein the method further comprises controlling the flow of primary effluent from the primary treatment system to the secondary treatment system based on the measured volumes of wastewater within the first and second septic tanks.

24. The method of claim 14,
wherein the condition of the wastewater stored in the first septic tank includes the volume of the wastewater in the first septic tank;
wherein the condition of the wastewater stored in the second septic tank includes the volume of the wastewater in the second septic tank; and
wherein determining the schedule for collecting wastewater from the first and second septic tanks is further based on a minimum throughput of primary effluent through the secondary treatment system that is required for operation of the secondary treatment system.

25. A method for treating wastewater arising from a plurality of oilfield well pads, comprising:
identifying a first well pad having a man camp with one or more septic tanks to be serviced by a centralized treatment facility;
identifying a second well pad having a man camp with one or more septic tanks to be serviced by the centralized treatment facility, wherein the second well pad is spaced apart from the first well pad;
analyzing infrastructure related to each of the first and second well pads;
determining a central location for the centralized treatment facility based on the analyzed infrastructure related to each of the first and second well pads,
wherein the infrastructure is existing or potential roads leading to each of the first and second well pads, and
wherein the central location is spaced apart from the first well pad and the second well pad;
treating, at the centralized treatment facility, wastewater collected from the one or more septic tanks of each of the first well pad and the second well pad, wherein treating the wastewater comprises performing solid settlement and influent equalization;
identifying a new well pad having a man camp with one or more septic tanks to be serviced by the centralized treatment facility;
analyzing infrastructure related to the new well pad;
determining a new central location for the centralized treatment facility based on the analyzed infrastructure related to each of the first well pad, the second well pad, and the new well pad; and
relocating the centralized treatment facility from the central location to the new central location.

26. The method of claim 25, further comprising analyzing the topography of the of the infrastructure.

27. The method of claim 25, further comprising estimating the daily volume of wastewater to be produced by each of the first and second well pads and adjusting the central location to be closer to the well pad with the larger estimated daily volume of wastewater production.

* * * * *